United States Patent [19]

Grimes et al.

[11] 4,277,317

[45] Jul. 7, 1981

[54] SHUNT CURRENT ELIMINATION AND DEVICE EMPLOYING TUNNELED PROTECTIVE CURRENT

[75] Inventors: Patrick G. Grimes, Westfield, N.J.; Markus Zahn, Gainesville, Fla.

[73] Assignee: Exxon Research & Engineering Co., Florham Park, N.J.

[21] Appl. No.: 97,194

[22] Filed: Nov. 26, 1979

[51] Int. Cl.³ .................. C25B 9/04; C25B 15/06; H01M 8/04; H01M 2/38

[52] U.S. Cl. ..................... 204/1 R; 204/228; 204/257; 204/268; 204/269; 429/14; 429/18; 429/51; 429/88

[58] Field of Search ............ 204/228, 267–270, 204/253–258, 237, 1 R, 231, 275, 129, 128, 98; 429/18, 12, 111, 14, 51, 88

[56] References Cited

U.S. PATENT DOCUMENTS

| | | | |
|---|---|---|---|
| 2,508,523 | 5/1950 | Krebs | 204/231 X |
| 3,378,405 | 4/1968 | Schumacker et al. | 136/86 |
| 3,537,904 | 11/1970 | Matsuda et al. | 136/86 |
| 3,540,934 | 11/1970 | Boeke | 136/86 |
| 3,616,315 | 10/1971 | Childs | 204/228 X |
| 3,634,139 | 1/1972 | Reiner | 136/86 R |
| 3,666,561 | 5/1972 | Chiku | 136/86 R |
| 3,773,561 | 11/1973 | Bjorkman | 136/86 A |
| 3,806,370 | 4/1974 | Nischik | 136/86 R |
| 3,909,368 | 9/1975 | Raymond et al. | 204/228 X |
| 3,964,929 | 6/1976 | Grevstad | 136/86 R |
| 4,025,697 | 5/1977 | Hart | 429/70 |
| 4,048,045 | 9/1977 | Eng et al. | 204/257 X |
| 4,049,878 | 9/1977 | Lindstrom | 429/18 |
| 4,057,473 | 11/1977 | Cunningham et al. | 204/128 X |
| 4,081,585 | 3/1978 | Jacquelin | 429/23 |
| 4,197,169 | 4/1980 | Zahn et al. | 204/228 X |

OTHER PUBLICATIONS

M. Tadayuki et al., "Prevention of Electrolytic Corrosion of an Aqueous Alkali Chloride Electrolysis Cell," Chemical Abstracts 89:170987g, vol. 89, 1978.

Burnett, J. C. and Danly D. E. "Current By Pass in Electrochemical Cell Assemblies," A.I.C.E. Nat'l Meeting, (Feb. 26-Mar. 1, 1978).

Primary Examiner—D. R. Valentine
Attorney, Agent, or Firm—Kenneth P. Glynn; Robert S. Salzman

[57] ABSTRACT

The present invention is directed to a method of minimizing shunt currents in electrochemical devices which have a plurality of cells connected, at least in part, in series and which have a common electrolyte which is fed to at least two of the cells as a shared electrolyte from a common manifold via individual inlet channels, whereby an electrical electrolytic conductive bypass path is created around such cells and through said shared electrolyte, resulting in undesirable shunt currents. This method involves providing electrolyte tunnels which connect the individual inlet channels and applying a protective current through said electrolyte tunnels and thus through said shared electrolyte, the protective current being of a magnitude which effectively at least reduces said shunt currents. Thus, a single protective current may be applied such that shunt currents are minimized, and preferably are totally eliminated. The present invention is also directed to an electrochemical device having means adapted for applying the protective current thereto.

42 Claims, 16 Drawing Figures

FIG.5

| Cell Voltages | Column B (ohms) | Column A (ohms) |
|---|---|---|
| 1.347 VOLTS | 1504 ohms / 103 | 1503 / 10.3 |
| 1.400 | 1506 / 103 | 1506 / 10.3 |
| 1.404 | 1492 / 102 | 1510 / 10.2 |
| 1.401 | 1510 / 102 | 1492 / 10.2 |
| 1.403 | 1501 / 102 | 1507 / 10.3 |
| 1.403 | 1498 / 102 | 1504 / 10.3 |
| 1.403 | 1503 / 102 | 1501 / 10.2 |
| 1.402 | 1508 / 102 | 1501 / 10.3 |
| 1.398 | 1494 / 102 | 1510 / 10.2 |
| 1.401 | 1498 / 103 | 1504 / 10.3 |
| 1.402 | 1495 / 102 | 1504 / 10.2 |
| 1.400 | 1493 / 102 | 1510 / 10.3 |
| | 1501 | 1501 |

CELL VOLTAGES AND RESISTOR VALUES

VALUES OF NETWORK RESISTORS IN OHMS

FIG. 6

| 16.66 VOLTS (OPEN CIRCUIT) | B | | UNPROTECTED CASE VOLTAGE ACROSS RESISTORS |
|---|---|---|---|
| | 5.63 VOLTS .216 | 2.458 .017 | |
| | 4.45 .365 | 2.262 .031 | |
| | 3.423 .465 | 1.929 .045 | |
| | 2.492 .529 | 1.508 .055 | |
| | 1.630 .570 | 1.033 .061 | |
| | .809 .586 | .524 .064 | |
| | .003 .588 | .001 .065 | |
| | −.801 .571 | −.522 .060 | |
| | −1.619 .530 | −1.031 .054 | |
| | −2.474 .468 | −1.508 .044 | |
| | −3.396 .361 | −1.932 .031 | |
| | −4.428 .213 | −2.262 .016 | |
| | −5.607 | A  −2.457 | |

| | B | |
|---|---|---|
| 3.449 .878 | | 4.403 .030 |
| 2.939 .833 | | 3.560 .054 |
| 2.388 .803 | | 2.780 .073 |
| 1.807 .783 | | 2.049 .086 |
| 1.213 .775 | | 1.352 .094 |
| .612 .767 | | .670 .098 |
| .003 .769 | | +.001 .101 |
| −.605 .778 | | −.669 .094 |
| −1.205 .786 | | −1.352 .086 |
| −1.792 .811 | | −2.053 .071 |
| −2.362 .827 | | −2.793 .054 |
| −2.920 .870 | | −3.567 .030 |
| −3.439 | A | −4.411 |

CELL STACK VOLTAGE 16.54

PROTECTED CASE 10ma, 9.684 VOLTS AT A-B

FIG. 7

| | B | |
|---|---|---|
| .230 | | 7.763 |
| | 2.011 | .053 |
| .400 | | 5.796 |
| | 1.636 | .090 |
| .660 | | 4.250 |
| | 1.383 | .119 |
| .666 | | 2.986 |
| | 1.222 | .141 |
| .521 | | 1.904 |
| | 1.129 | .150 |
| .285 | | .925 |
| | 1.081 | .157 |
| 0.000 | | .001 |
| | 1.084 | .159 |
| −.283 | | −.925 |
| | 1.133 | .151 |
| −.520 | | −1.907 |
| | 1.226 | .139 |
| −.658 | | −2.995 |
| | 1.398 | .118 |
| −.636 | | −4.274 |
| | 1.623 | .091 |
| −.395 | | −5.806 |
| | 1.988 | .052 |
| −.208 | A | −7.679 |

V CELL STACK = 16.48

PROTECTED CASE
26 ma, 16.418 VOLTS AT A-B

| | B | |
|---|---|---|
| −.901 | | 8.264 |
| | 2.206 | .057 |
| −.068 | | 6.171 |
| | 1.774 | .096 |
| .337 | | 4.494 |
| | 1.482 | .128 |
| .451 | | 3.140 |
| | 1.295 | .149 |
| .389 | | 1.994 |
| | 1.187 | .160 |
| .222 | | .966 |
| | 1.132 | .166 |
| −.001 | | .000 |
| | 1.135 | .170 |
| −.221 | | .966 |
| | 1.190 | .161 |
| −.390 | | −1.997 |
| | 1.299 | .148 |
| −.444 | | −3.149 |
| | 1.497 | .126 |
| −.316 | | −4.520 |
| | 1.759 | .097 |
| .067 | | −6.183 |
| | 2.183 | .057 |
| .867 | A | −8.307 |

V CELL STOCK = 16.37

PROTECTED CASE
30ma, 18.143 VOLTS AT A-B

SHUNT CURRENT ELIMINATION AND DEVICE EMPLOYING TUNNELED PROTECTIVE CURRENT

BACKGROUND OF THE INVENTION (1) Field of the Invention

The present invention is directed to the reduction or elimination of undesirable shunt currents in electrochemical cell devices having a plurality of cells connected, at least in part, in series, and having an electrolyte which is a common electrolyte to at least two of these cells, and which includes shared electrolyte, whereby an electrical electrolytic conductive bypass path is created around these cells and through said shared electrolyte, which results in undesirable shunt currents. More specifically, the present invention is directed to such shunt current reduction or elimination by appropriate application of a protective current through tunnels connecting and to an electrochemical device for achieving this result.

(2) Prior Art

In multicell electrochemical devices having a plurality of cells in series and having a common electrolyte, e.g., circulating through the cells, shunt current losses (also known as current bypasses) occur as a result of conductive paths through the electrolyte during both charge and discharge. These shunt current losses may also occur under open circuit conditions, and cause undesired discharge of electrochemical devices. Additionally, these shunt currents may have secondary undesirable effects on electrochemical devices. For example, uneven or improper plating of a functional component may occur, ultimately resulting in a shortened utility of the device. Also, corrosion of the electrodes and/or other components may occur, reactants may unnecessarily be consumed and excess thermal losses may result. Thus, shunt current problems have been recognized in the field of electrochemical devices for many reasons, and various modifications to such devices have been made to reduce or eliminate these as well as other recognized problems.

For example, it has been suggested that multiple cell systems include electrical isolation means for minimizing shunt current effects. Thus, U.S. Pat. No. 3,773,561 (Bjorkman) teaches that internal short circuiting of a plurality of electric cells of a cell stack may be prevented during shutdown, or standby, by sealing off the cells from electrical contact with each other by closing off inlet and outlet ports to isolate electrolyte portions in the individual cells. U.S. Pat. No. 3,806,370 (Nischik) describes an electrolyte interrupter system for providing intermittent flushing of the electrolyte in a fuel cell battery having several fuel cells in which the electrodes are held in plastic frames. The electrolyte interrupter system is made up of an electrolyte distributor and an electrolyte manifold arranged in the frames of the individual fuel cells. Electrolyte supply ducts for each cell open into the electrolyte distributor, and electrolyte discharge ducts for each cell open into the electrolyte manifold. The electrolyte distributor and the electrolyte manifold are each formed by mutually aligned holes in the upper portions of the frames, with the bottom of the holes forming the electrolyte distributor being located at least at the same height as the openings of the electrolyte discharge ducts leading into the electrolyte manifold. U.S. Pat. No. 3,378,405 (Schumacher et al) teaches the electrical isolation of cells from one another in a sodium amalgam anode-oxidant multicell fuel cell system by using one, and preferably two, dielectric interrupters per cell. U.S. Pat. No. 4,025,697 (Hart) describes multicell devices in which electrolyte is distributed in a two stage system in which a large pump (first stage) distributes the electrolyte through hydraulically driven circulators (second stage) to individual electrode compartments which are electrically isolated from each other. The overall system results in minimizing intercell leakage and intercell power losses through shorting circuits through the electrolyte.

Other techniques for electrolyte interruption, as a means for preventing internal or shunt current losses in multicell devices, have also been taught. For example, U.S. Pat. Nos. 3,537,904 (Matsuda et al) and 3,522,098 (Sturm et al) describe the insertion of gas bubbles into the electrolyte solution to reduce or break up the conductive path through the electrolyte.

Alternative methods have also been suggested. For example, U.S. Pat. No. 3,666,561 (Chiku) describes an invention which provides an electrolyte circulating battery in which the flow of current between cells is minimized by having branched electrolyte inlet and outlet passages to and from the cells, these passages being greatly lengthened and considerably reduced in cross-section so that the electrical resistance of the electrolyte in each branched passage is increased. The patent also teaches further preventing internal currents by the use of gas bubbles injected into the electrolyte paths to further increase electrical resistance.

Geometric redesign has also been employed without gas bubbles to prevent or reduce shunt current or internal circuit losses. For example, U.S. Pat. No. 3,964,929 (Grevstad) teaches shunt current protection in fuel cell cooling systems by providing coolant circulation means and plenums adapted to create high electrical resistance paths. U.S. Pat. No. 3,540,934 (Boeke) points out that in-series multicell redox systems may have shunt current problems even when electrically non-conductive tubing is used. The patent teaches that electrical shunting will cause negligible inefficiency if the individual electrolyte fluid passages, connecting each individual electrode chamber with a central flow system, have a length to average inside diameter ratio of ten to one or more. U.S. Pat. No. 3,634,139 sets forth a design approach to the shunt current problems. The patent teaches that leakage currents can be minimized by proper manifold design. As an example, it is stated that by making electrolyte branch (or channel) ports small even though the manifold diameter is relatively large, leakage current can be neglected. However, if the ports are made too small, electrolyte flow may be retarded. The patent states that ports of about one-tenth of an inch in diameter are acceptable and manifolds of about one-eighth of an inch in diameter are acceptable.

U.S. Pat. No. 4,049,878 (Lindstrom) is representative of the present state of the art effort to solve leakage current problems. This patent indicates that many electrochemical devices contain a plurality of cells in stacked formation, which cells may be coupled in parallel groups, which groups are in turn coupled in series. Other embodiments are multicell devices in which the cells are only coupled in series. It is stated that more complicated coupling patterns are possible which are determined by the desire to reduce leakage currents in the electrolyte system and to create conditions for special electrical control modes with in-and-out coupling of individual parts of the stack. It is also pointed out that the natural way to reduce leakage currents is to minimize the dimensions of electrolyte channels, but that this technique results in electrolyte flow problems. The patent teaches a manner in which these problems may be avoided. The technique involves the use of fluid connections or cross-channels which are set up between the electrolyte spaces in the cells, which cells are being coupled electrically in parallel. These cross-channels are, in one embodiment, arranged in the lower parts of the electrolyte spaces so that some electrolyte is transferred between these electrolyte spaces by means of the cross-channels. In another embodiment, the cross-channels are also provided between the electrolyte spaces in the parallel-connected cells in the upper parts of the electrolyte spaces in order to produce a so-called plenum.

In a recent article by Burnett and Danley, of Monsanto, "Current Bypass in Electrochemical Cell Assemblies," presented at the American Institute of Chemical Engineers' National Meeting, Atlanta (Feb. 26–Mar. 1, 1978) Symposium on Electro-organic Synthesis Technology, Session 1, Operating Experience with Electro-organic Processes, the problems of shunt current in circulating electrolyte multicell in-series devices is examined and derivations of certain mathematical relationships between geometry related currents and resistances in such devices are developed. The authors conclude that current bypass losses for certain cell arrangements may be held at an acceptable level, but that the losses increase rapidly with an increasing number of cells. Further, no specific solution for elimination of shunt current or current bypass of the type used in the present invention is derived or suggested. In fact, the authors describe 8 ft. long cell connections to the manifold to reduce the losses effected by shunt currents.

Recently issued U.S. Pat. No. 4,081,585 (Jacquelin) appears to be the only prior art reference which reduces leakage currents by nulling with electrodes. However, unlike the method and device of the present invention, this patent teaches the use of at least four times as many sets of electrodes as modules of cells and employs these electrodes in branch channels, an inferior and expensive technique at best.

Copending United States patent application Ser. No. 939,325, filed on Sept. 5, 1978 by Zahn et al now U.S. Pat. No. 4,197,169, and entitled "Shunt Current Elimination and Device" is directed to a method of minimizing shunt currents in electrochemical devices which have a plurality of cells connected, at least in part, in series and which have an electrolyte which is at least electrolyte to at least two of the cells and which includes shared electrolyte, whereby an electrical electrolyte conductive bypass path is created around such cells and through said shared electrolyte, resulting in undesirable shunt currents. This method involves applying a protective current through at least a portion of said conductive bypass path through said shared electrolyte in a direction which is the same as the shunt current through said shared electrolyte and of a magnitude which effectively at least reduces said shunt currents. A single protective current is applied in series with at least a portion of the conductive bypass path such that shunt currents are minimized or eliminated. This application is also directed to an electrochemical device having means adapted for applying the protective current thereto. However, no recognition is made of the fact that tunnels may be advantageously employed in this system, a critical aspect of the present invention.

Notwithstanding all of the foregoing efforts in the field to overcome shunt current (leakage current) problems in multicell electrochemical devices, the novel and effective technique of the present invention has not heretofore been taught or suggested. In fact, many of the prior art teachings as represented by the above references are directed toward problematic techniques which themselves create design and flow difficulties.

DESCRIPTION OF THE PRESENT INVENTION

The present invention is directed to a method of minimizing shunt currents in electrochemical devices which have a plurality of cells connected, at least in part, in series and which have a common electrolyte which is fed to at least two of the cells as a shared electrolyte from a common manifold via individual inlet channels, whereby an electrical electrolytic conductive bypass path is created around such cells and through said shared electrolyte, resulting in undesirable shunt currents. This method involves providing electrolyte tunnels which connect the individual inlet channels and applying a protective current through said electrolyte tunnels and thus through said shared electrolyte, the protective current being of a magnitude which effectively at least reduces said shunt currents. Thus, a single protective current may be applied such that shunt currents are minimized, and preferably are totally eliminated. The present invention is also directed to an electrochemical device having means adapted for applying the protective current thereto.

BRIEF DESCRIPTION OF THE DRAWINGS

FIG. 5 illustrates cell voltages and resistor values for a resistor board, multiple Ni-Cd battery system;

FIG. 6 illustrates the voltages across resistors for the same system;

FIGS. 7 through 14 illustrate voltages for various protective currents applied across the same system;

DETAILED DESCRIPTION OF THE INVENTION AND DRAWINGS

Figure 1:
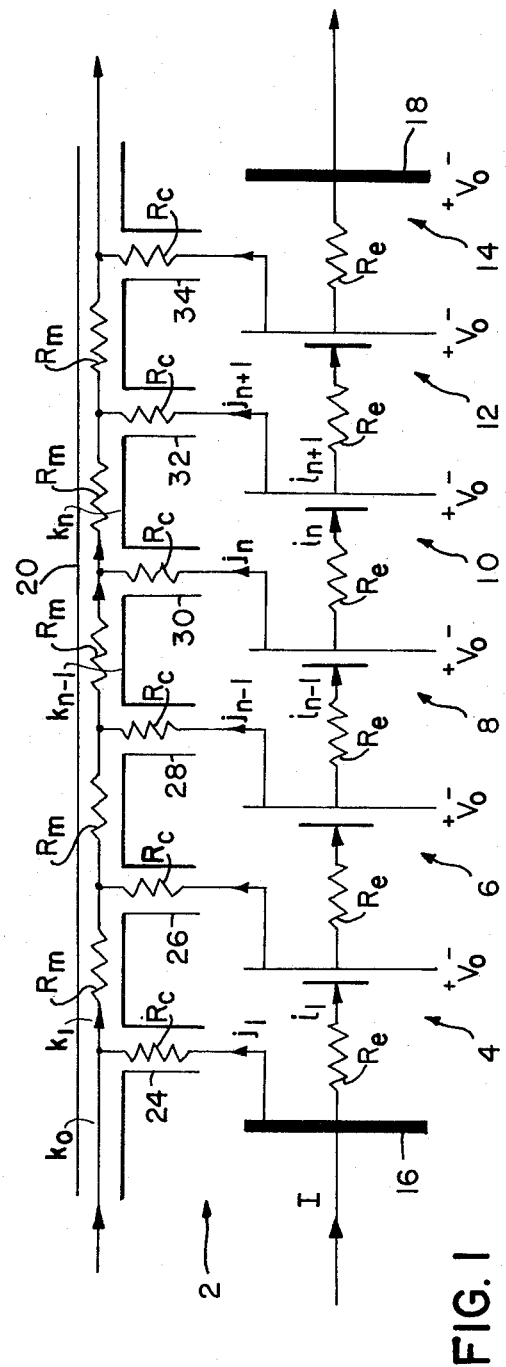
FIG. 1 illustrates schematically a resistor board layout of an electrochemical device of the prior art copending U.S. patent application Ser. No. 939,325 to Zahn et al cited above.

In multicell electrochemical devices having a plurality of cells in series and having an electrolyte which is a common electrolyte to two or more such cells and which includes shared electrolyte, shunt current losses occur as a result of electrical electrolyte conductive bypass paths through the electrolyte around the cells. The present invention is directed to the minimization of shunt currents in such systems and to devices for achieving this result.

As used herein, the term "electrochemical devices" shall be meant to include photoelectrochemical devices such as water photolysis cell devices, photogalvanic cell devices, liquid solar cell devices and to include other electrochemical devices such as batteries, fuel cell devices, chlor-alkali cell devices, metal-air devices, sea water batteries, electrolyzers, electrochemical synthesizers, and electrowinning devices, as well as other devices employing cathodes, anodes and common electrolytes, including bipolar and monopolar multicell devices, and including devices having a plurality of electrolytes (e.g., catholytes and anolytes).

As used herein, the term "common electrolyte" shall mean an electrolyte which is employed in and distributed to two or more cells, the electrolyte comprising a physical continuum. In a circulating electrolyte system using other or more manifolds, the physical continuum includes the electrolyte contained within the manifolds, the branch channels and the cells.

As used herein, the term "shared electrolyte" shall mean that portion of the electrolyte which is located in an area of commonality to the electrolyte contained in individual components. Thus, in a circulating electrolyte system using one or more manifolds, the electrolyte contained within reservoir(s) and manifold(s) is the shared electrolyte, and electrolyte contained in branch channels, cells and other individual components is not shared electrolyte.

As used herein, the expression "minimization of shunt currents" shall be used to mean reduction of shunt currents or elimination of shunt currents.

In the development of the invention of copending United States patent application Ser. No. 939,325 to Zahn et al, a resistance equivalent circuit model was derived for a multicell series electrochemical device having a common electrolyte which is physically connected in a continuum to the cells of the device via a common manifold or manifolds, establishing shared electrolyte, and through channels for each cell. The model was developed with the assumption that all of the cells in the device were identical. Based on this assumption, the governing circuit equations were written as linear, constant coefficient difference equations for which general closed form solutions were obtained for currents in the electrolyte within the cells (intracells), within the channels and within the manifold (shared electrolyte). Because the channel resistance was found generally to be much larger than the manifold and intracell electrolyte resistances, approximate algebraic solutions were also developed. It was demonstrated that a single externally imposed current passed from the last cell to the first cell can result in minimization of shunt currents and, in fact, optimally, may effectively set all channel currents to zero.

Each cell was modeled as an ideal voltage source $V_o$ equal to its open circuit potential, in series, with an intracell electrolyte resistance $R_e$. Then, as shown in FIG. 1, the current through the electrodes divided so that some current passed through each channel into the manifold (shared electrolyte). The variables used in FIG. 1 are as follows:

$R_m$ = manifold resistance;
$R_c$ = channel resistance;
$R_e$ = intracell electrolyte resistance (including internal components such as separators and membranes);
$V_o$ = open circuit cell voltage;
$V$ = actual cell voltage including ohmic voltage drop ($V \approx V_o + IR_e$ with protection);
$i_n$ = the principal electrolyte current through the nth cell;
$j_n$ = the channel shunt current through the nth channel;
$k_n$ = the manifold shunt current through the manifold between the nth and the nth+1 channels;
$k_o$ = the current through the manifold needed to reduce shunt currents to zero; and,
$I$ = the total terminal current through the electrochemical device.

As shown in FIG. 1, the prior art electrochemical device is illustrated schematically as 2 and contains cells 4, 6, 8, 10, 12, and 14 arranged in series. Current I passes through device 2 from end plate 16 to end plate 18, as shown. Common electrolyte (not shown) forms a single physical continuum through each cell via common manifold 20, containing shared electrolyte, through individual cell channels 24, 26, 28, 30, 32, and 34. The resistance of the electrolyte in each cell is shown as $R_e$, the resistance of the manifold is shown as $R_m$ and the resistance of each channel is shown as $R_c$. The currents $i_n$, $j_n$ and $k_n$, as defined above, are also illustrated.

Each electrolyte section was modeled with its appropriate resistance. Kirchoff's current and voltage laws applied at the nth cell requires:

$$i_{n-1} - i_n = j_n \tag{1}$$

$$k_{n-1} - k_n = -j_n \tag{2}$$

$$k_{n-1}R_m - R_c(j_n - j_{n-1}) - i_{n-1}R_e = V_o \tag{3}$$

The algebra is greatly simplified if equation (3) is rewritten with the index n increased by 1:

$$k_n R_m - R_c(j_{n+1} - j_n) - i_n R_e = V_o \tag{4}$$

Then by substracting (4) from (3) the terms involving the i's and k's just equal $j_n$ from (1) and (2) so that a single equation for the channel shunt currents is obtained:

$$j_{n+1} - B j_n + j_{n-1} = 0 \tag{5}$$

wherein B is equal to $2 + (R_e + R_m)/R_c$.

Just as linear constant coefficient differential equations have exponential solutions, linear constant coefficient difference equations as in (5) had power law solutions of the form:

$$j_n = A\lambda^n \tag{6}$$

wherein A is the amplitude and wherein the characteristic parameter $\lambda$ (analogous to natural frequencies in continuous systems described by differential equations) was found by substituting the assumed solution of (6) back into (5):

$$A\lambda^{n-1}[\lambda^2 - B\lambda + 1] = 0 \tag{7}$$

For non-trivial solution ($A \neq 0$, $\lambda \neq 0$), the bracketed term in (7) must be zero:

$$\lambda = B/2 \pm \sqrt{(B/2)^2 - 1} \tag{8}$$

Note that the two solutions in (8) are reciprocals of each other:

$$B/2 + \sqrt{(B/2)^2 - 1} = \frac{1}{B/2 - \sqrt{(B/2)^2 - 1}} \qquad (9)$$

Because (5) is linear, the most general solution was a linear combination of both allowed solutions:

$$j_n = A_1 \lambda^n + A_2 \lambda^{-n} \qquad (10)$$

where $\lambda$ is either root in (8).

The amplitudes $A_1$ and $A_2$ were evaluated by the boundary conditions. By symmetry, the current in the first cell $j_1 = J$ had an equal magnitude but opposite direction to the current in the last cell, $j_n = -J$.

$$j_1 = J = A_1 \lambda + A_2 \lambda^{-1}$$

$$j_N = -J = A_1 \lambda^N + A_2 \lambda^{-N} \qquad (11)$$

with solutions:

$$A_1 = \frac{-J(1 + \lambda^{-N+1})}{\lambda^N - \lambda^{-N+2}}$$

$$A_2 = \frac{J\lambda(\lambda + \lambda^N)}{\lambda^N - \lambda^{-N+2}}$$

Applying algebraic reduction, the channel currents were:

$$j_n = \frac{J}{\lambda^N - \lambda}[-\lambda^n + \lambda^{N-n+1}] \qquad (12)$$

At this point, J was not yet known. However, $j_n$ was used in solving equations (1) and (2). Focusing attention on (1), the homogeneous solution was first found by assuming $j_n$ as zero. Assuming power law solutions, the natural solution was a constant:

$$i_{n-1} - 1_n = 0; \; i_n = Ap^n \qquad (13)$$

$$Ap^{n-1}(1-p) = 0; \; p = 1; \; i_n = A \qquad (14)$$

The driven solution must have the same power law dependence as the $j_n$ and so were of the same form as (10). The total solution was then:

$$i_n = I + \frac{J\lambda}{(\lambda^N - \lambda)(\lambda - 1)}[\lambda^n + \lambda^{N-n} - 1 - \lambda^N] \qquad (15)$$

where the constant A in (14) was adjusted so that $i_0 = I$, where I is the terminal current. Under open circuit conditions, $I = 0$. When the battery is being charged, I is positive; while under load, I is negative.

Similarly, the manifold shunt currents were:

$$k_n = k_o - \frac{J\lambda}{(\lambda^N - \lambda)(\lambda - 1)}[\lambda^n + \lambda^{N-n} - 1 - \lambda^N] \qquad (16)$$

where the initial manifold current $k_o$ was yet unspecified.

The important parameter J, which is the first channel current, was not yet known. Using (13), (14), (15), and (16) in (3) for any value of n (n=2 is the easiest), yielded (17) or (18):

$$J = \frac{V_o + IR_e - k_o R_m}{R_m + R_e + \left[\frac{R_c(\lambda - 1)(\lambda^{N-1} + \lambda)}{(\lambda^N - \lambda)}\right]} \qquad (17)$$

$$J = \frac{(V_o + IR_e - k_o R_m)(\lambda^N - \lambda)(\lambda - 1)}{\lambda(R_e + R_m)(1 + \lambda^N)} \qquad (18)$$

The foregoing equation (17) or its alternative equivalent form (18), revealed that J could be modified if $k_o$ had a value other than zero. If J, the shunt current in the first branch channel, was reduced, then the $j_n$'s (equation (12)) were reduced. If $k_o$ had a value such that $$k_o = (V_o + IR_e/R_m) \qquad (19)$$

then J was zero and likewise all the $j_n$'s were zero.

In this condition, equations (12), (15) and (16) reduce to:

$$i_n = I, \; k_n = k_o; \; j_n = 0 \qquad (20)$$

Thus, the foregoing suggested that the passage of a single protective current through the shared electrolyte in the manifold, in a device similar to that in FIG. 1, might minimize (reduce or eliminate) shunt or leakage currents.

The direction of this current is the same as the unprotected $k_n$ currents, i.e. the shunt current through the shared electrolyte.

It can also be seen from the above equations and the model in FIG. 1 that when a $k_o$ equal to that defined in equation 20 is passed through the shared electrolyte, that the voltage at each junction of the branch channel and the shared space is equal to that cell voltage. Thus, when the voltage drop through the branch channel is zero, there is no current. The voltage through the branch channel is nulled.

However, the voltages in the branch channels are not nulled when $k_o$ is different from equation (20). Nonetheless, the shunt currents in these channels were reduced by applying some protective voltage, and this was found to be useful in practical electrochemical devices wherein an exact $k_o$ from equation (20) was not feasible.

From the practical standpoint, the utility of the foregoing approach required a non-zero $R_m$. Furthermore, the utility was enhanced by geometric effects which increased the magnitude of $R_m$. Such effects could be increasing the length of the shared electrolyte space between cells and a reduction of the cross-sectional area of the shared electrolyte space. The ratio of the protective current to the current of the electrochemical device was thus reduced when the ratio of $R_m/R_e$ was increased. Hydraulic factors, however, should be considered, in particular with circulating systems, and design compromises made between flow of electrolyte and the passage of current in the shared space may be appropriate.

The foregoing analysis assumes a model in which the values of $R_m$, $R_c$, $R_e$, and $V_o$ are the same for all cells. However, in a practical device, these values will be determined by system geometry and manufacturing tolerances. It is obvious, however, even in such cases, that the passage of protective current through the shared electrolyte will modify and reduce currents in the branch channels, although in such cases absolute nulling may not be accomplished.

Thus, to summarize, shunt currents (and their effects) can be reduced or eliminated by a passage of a current through the manifold electrolyte (in the same direction as the shunt currents) and the passage of this current will be accomplished by a voltage drop down the manifold. The voltage difference between the cells through the channels to the manifold will be reduced, and, as the current is increased, the voltage difference approaches zero. (At sufficiently large currents through the manifold, the voltage difference through the channels becomes negative.)

The shunt currents from the cells through the shared electrolyte, as the voltage difference is nulled, become smaller and are eliminated. It follows that the power requirements for the reduction or elimination are determined by the resistance of the manifold and are independent of the resistance of the channels. The power requirements (P) for the protective current through the manifold directly above the N cells in a series of cells is approximated by:

$$P \approx ((NV)^2 / NR_m) \tag{21}$$

where N is number of cells, V is the cell voltage and $R_m$ is the resistance of a single manifold segment.

It has now been discovered that the power requirements for reduction of shunt currents can be markedly reduced by adding connecting tunnels between the individual cell channels. The protective current is applied at the junction of the tunnel with the first channel and at the junction of the tunnel with the last channel so as to pass through the connecting tunnels. The power and current requirements are lower, the closer the tunnels are to the junction of the channels to the cells. Optionally, additional protective current may also be inserted in the manifold via $k_o$, as desired. Thus, it is possible to operate with $k_o$ equal to zero and to thereby achieve or approach total shunt current elimination.

Figure 2:
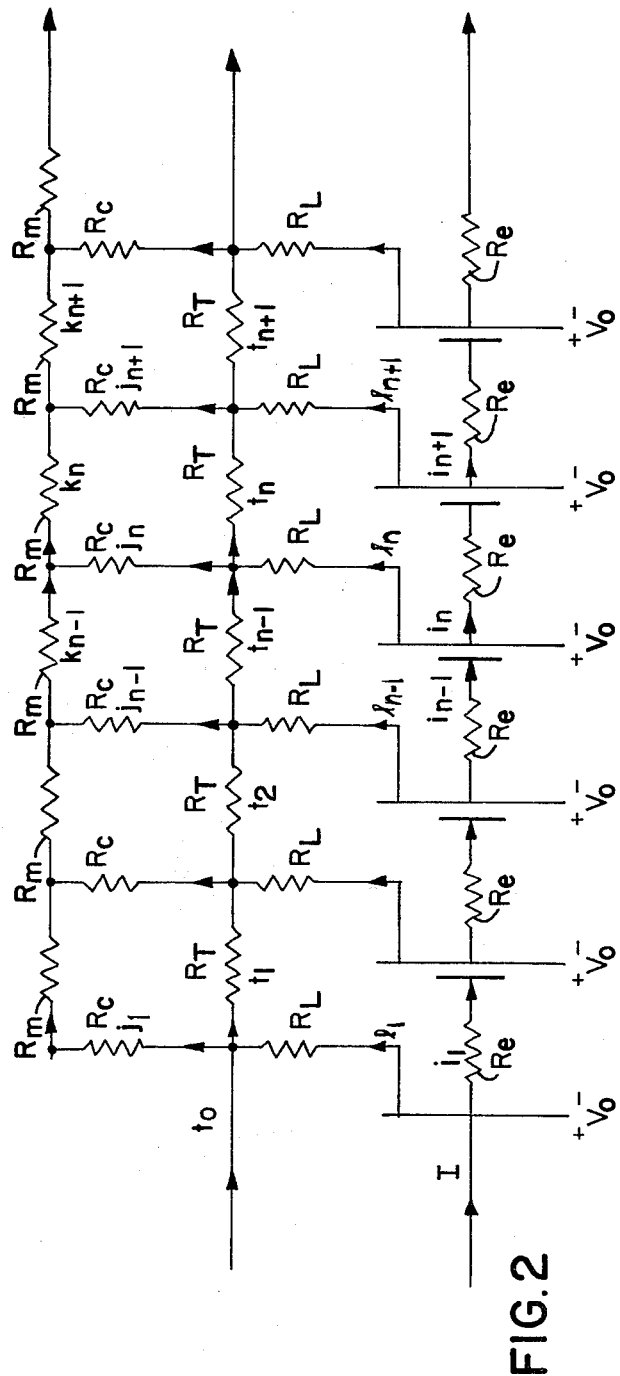
FIG. 2 illustrates schematically a resistor board layout of an electrochemical device of the present invention.

The resistor network for this system of the present invention is shown in FIG. 2. The variables identical to those of the prior art FIG. 1 are identically labeled, the variables being as follows:

$R_e$ = intracell electrolyte resistance;
$R_c$ = channel resistance;
$R_m$ = manifold resistance;
$R_T$ = tunnel resistance;
$R_L$ = leg resistance;
$t_o$ = tunnel input current needed to minimize shunt currents;
$t_n$ = tunnel current;
$l_n$ = leg current;
$j_n$ = current shunt current;
$k_n$ = manifold shunt current;
$i_n$ = cell current;
$V_o$ = open circuit cell voltage;
I = total terminal current The electrochemical device of the present invention comprises a conventional electrochemical device having a plurality of cells in series, and having a common electrolyte which is fed to at least two cells as a shared electrolyte from a common manifold via individual inlet channels, whereby an electrical electrolytic conductive bypass path is created around these cells and through said shared electrolyte, which results in undesirable shunt currents, and further includes novel electrolyte tunnels which connect the individual inlet channels as well as means adapted to apply a protective current through said electrolyte tunnels and thus through the shared electrolyte to effectively minimize the shunt currents. Such means include oxidation/reduction reaction means at the far ends of the connected tunnels of the electrochemical devices. These oxidation/reduction reactions should be compatible with the chemistry of the electrochemical device, as more fully described below. Additionally, while the present invention is developed with respect to inlet manifold, inlet channels and connecting tunnels, and discussed in terms of these aspects, the present invention is also directed to the method and device wherein tunnels are employed connecting outlet channels of outlet manifolds. In fact, in preferred embodiments, the method and device of the present invention employs both inlet side and outlet side connecting tunnels with protective currents applied thereto.

Thus, the present invention involves a method and device involving the application of a protective current through electrolyte tunnels connecting channels to individual cells from a manifold in an operating electrochemical device having a plurality of cells connected, at least in part, in series, and having an electrolyte which is fed to at least two such cells as a shared electrolyte from the manifold via the channels, whereby an electrical electrolytic conductive bypass path is created around these cells and through said shared electrolyte, resulting in undesirable shunt currents in the absence of said protective current. Although the magnitude of the protective current may be determined by substitution of actual numbers of variables in mathematical equations, it should be noted that the retardation rather than total elimination of shunt current may be effected by employing a protective current of a different magnitude, if desired. Also, the magnitude of the protective current itself may be determined by trial and error independent of the foregoing equations, once the above described principles and criteria are recognized.

In the method and device of the present invention, there is a conversion from electronic current to electrolytic current. For example, electrodes may be inserted into shared electrolyte in the tunnels at or near the first and last tunnel junctures. Oxidization/reduction reactions at these electrodes convert the electronic current to an ionic current. Thus, at least in principle, any redox reactions may be used. For example, they could be the same as the reactions at the electrodes of the electrochemical device. Alternatively, other reactions may be used which are compatible chemically and electrically with the electrochemical device.

For example, $H_2$ could be anodically oxidized at one end of the tunnels in the electrochemical device and $H_2$ could be evolved at the other end. The two reactions in acidic solution would be $H_2 \rightarrow 2H^+ + 2e$ (anodic)

and $2H^+ + 2e \rightarrow H_2$ (cathodic)

The $H_2$ gas produced could be piped back to the anodic electrode.

In another case, bromide could be oxidized at one electrode and bromine reduced at the other:

$2Br^- \rightarrow Br_2 + 2e$ $2e + Br_2 \rightarrow 2Br^-$

In another case, Zn could be oxidized at the anode and reduced at the cathode:

$$Zn° \rightarrow Zn^{++} + 2e$$

$$Zn^{++} + 2e \rightarrow Zn°$$

The choice of the redox reactions is dependent on the particular system being protected and could follow standard electrochemistry, as a matter of choice. Further, the voltage and current requirements for the protective circuit will depend upon the choice of redox reactions and the resistance of the manifold solution in accordance with the foregoing discussion.

It should be noted that the electrochemical device described herein is one in its simplest terms which has a plurality of cells connected, at least in part, in series. However, an electrochemical device of the present invention may be just that or may, on a larger scale, consist of two or more blocks of cells connected electrically in series and have common electrolyte(s) supplied to and removed from the blocks in parallel from major manifolds. Each block of cells may consist of two or more cells in series, with these cells being supplied with electrolyte in parallel from submanifolds in the block of cells. Such systems would have shunt currents within the blocks through the block manifolds and would have shunt currents between the blocks of cells through the main manifolds. These can be minimized with protective currents in the block manifolds and in the main manifolds, as desired, without exceeding the scope of the present invention.

In a preferred embodiment of the present invention, the method and device involve a circulating electrolyte (or electrolytes) whereby circulation through the device is achieved via inlet and outlet channels to individual cells from two or more manifolds having a circulating common electrolyte, including shared electrolyte, through which the electrical electrolytic conductive bypass path is created, resulting in shunt currents. This embodiment involves the use of two sets of symmetrical, linear tunnels, one set connecting the inlet channels and the other set connecting the outlet channels. Also, means are provided for the application of a protective current through each of the two sets of tunnels, i.e., through a shared electrolyte portion of the conductive bypass path, to minimize the shunt currents. The protective circuit involves the passage of an electrolytic current through shared electrolyte in the tunnels and thus acts to minimize the production of shunt currents through the manifold(s) and through the channels connecting the cells to the manifold(s) while also minimizing power requirements.

It is believed that the present invention embodying the method of minimizing shunt currents in electrochemical devices by employing protective currents and devices to achieve that result, will become more apparent from the following examples discussed in conjunction with the remaining drawings.

EXAMPLE 1

Figure 3:
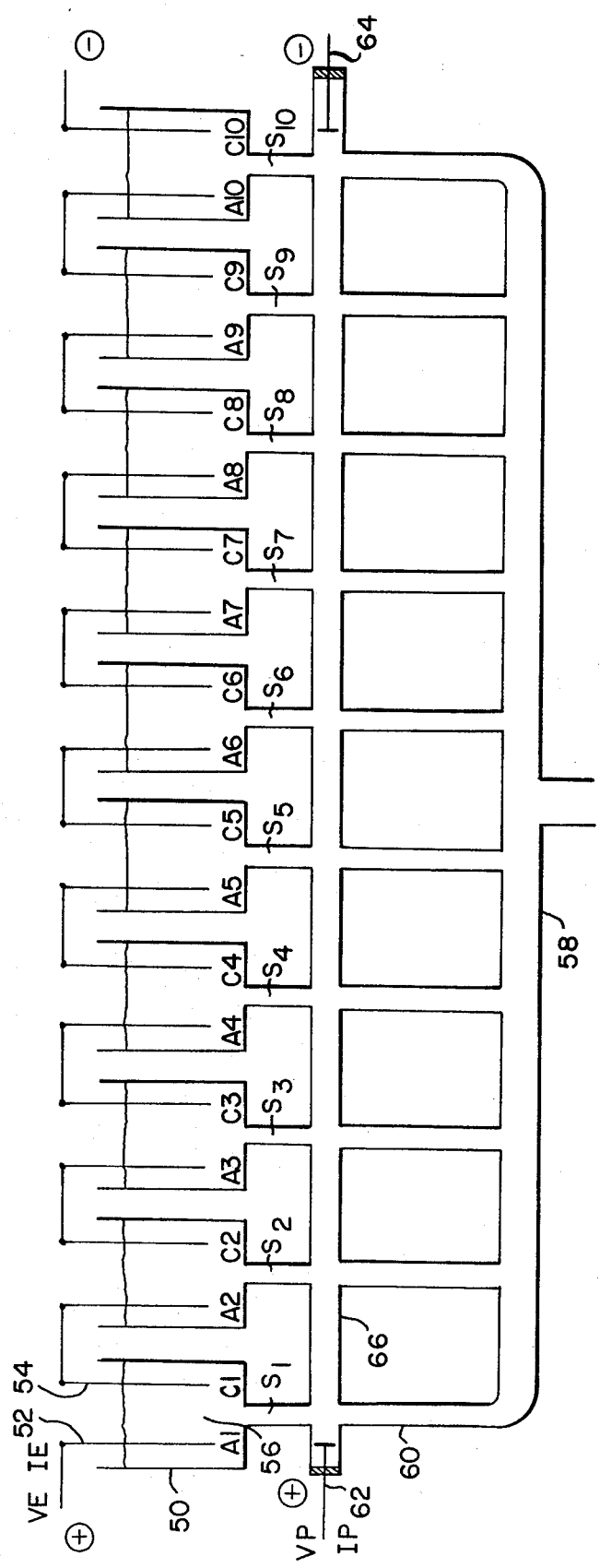
FIG. 3 is a schematic illustration of an electrolyzer device of the present invention.

A ten cell $H_2O$ electrolyzer device is set up as shown in FIG. 3. In that figure, an exemplary cell is represented generally by 50. Cell 50 contains anode 52; cathode 54 and electrolyte 56. The anode and cathode are designated as $A_1$ and $C_1$, respectively, for this cell. $A_2$ and $C_2$ for the second cell; and $A_{10}$ and $C_{10}$ for the last (tenth) cell. $V_E$ and $I_E$ represent the voltage and current input to the device. Electrolyte is distributed through the cells by common manifold 58 (area of shared electrolyte) and cell channels exemplified by channel 60. The shunt current of the first cell is designated as $S_1$ in channel 60, and $S_2$, $S_3$, $S_4$, etc. through $S_{10}$ for the remainder of the cells, respectively. Tunnels connecting the channels are shown as tunnels 66. The manifold 58 is about 0.25 inches in diameter and 25 inches long, and each channel about 0.125 inches in diameter and about 5 inches long. The tunnels are about 0.05 inches in diameter and about $2\frac{1}{4}$ inches long. The tunnels 66 contain protective current electrodes 62 and 64, as shown, in the shared electrolyte, with a protective current $I_p$ and a protective voltage $V_p$. The channels, tunnels, manifolds, and cell walls are made of non-conductive materials. Also, the protective current electrodes (nickel) 62 and 64 are near, but not at, the junction of the channels and the first and last tunnels, being placed within an area of shared electrolyte, as shown.

The device shown in FIG. 3 is operated with $V_E$ at 20.8 volts and $I_E$ at 124 ma. The evolution of $H_2$ and $O_2$ from the water occurs and, without protection, is observed to decrease in quantity toward the center of the group of cells, i.e., as measured from either end going toward the center cells. A portion of the input current is shunting through the common electrolyte manifold and thus the available current for gas $H_2$ and $O_2$ production is less in the center of the group of cells than at the end cells. A second power supply is then connected to protective current electrodes located in the shared electrolyte in the tunnels. The two levels of current are passed through the shared electrolyte in the tunnels. Subsequently, the current supplied to the electrolysis cell group is observed to be raised by a significant factor. The second power supply is then removed and the shunt currents in the unprotected channels reappear.

Thus, by application of a protective current through the shared electrolyte in the tunnels of the electrolyzer, shunt currents are considerably minimized through the conductive bypass path formed by the channels and manifold.

EXAMPLE 2

Figure 4:
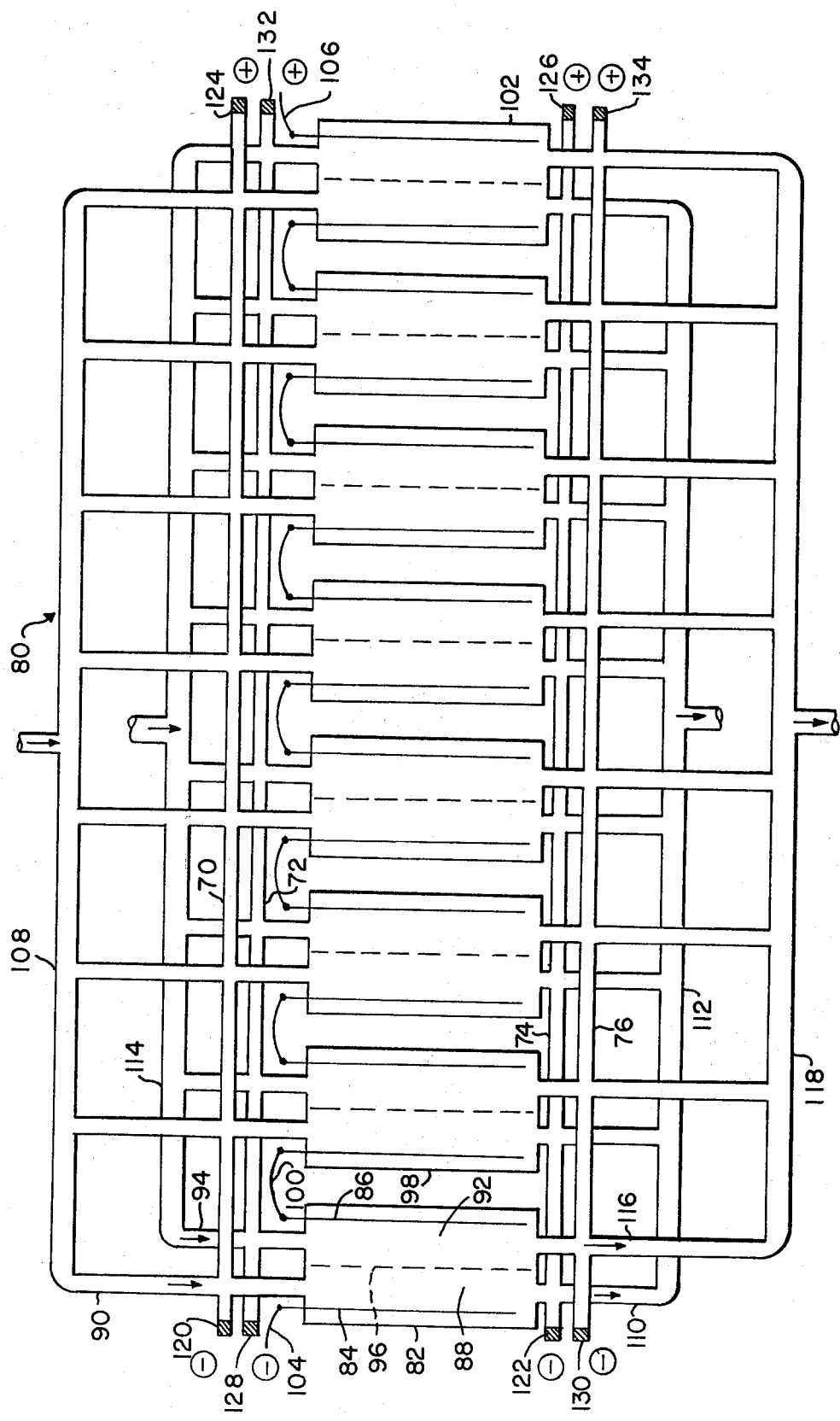
FIG. 4 illustrates a dual electrolyte (anolyte and catholyte) multicell battery device of the present invention.
Figure 8:
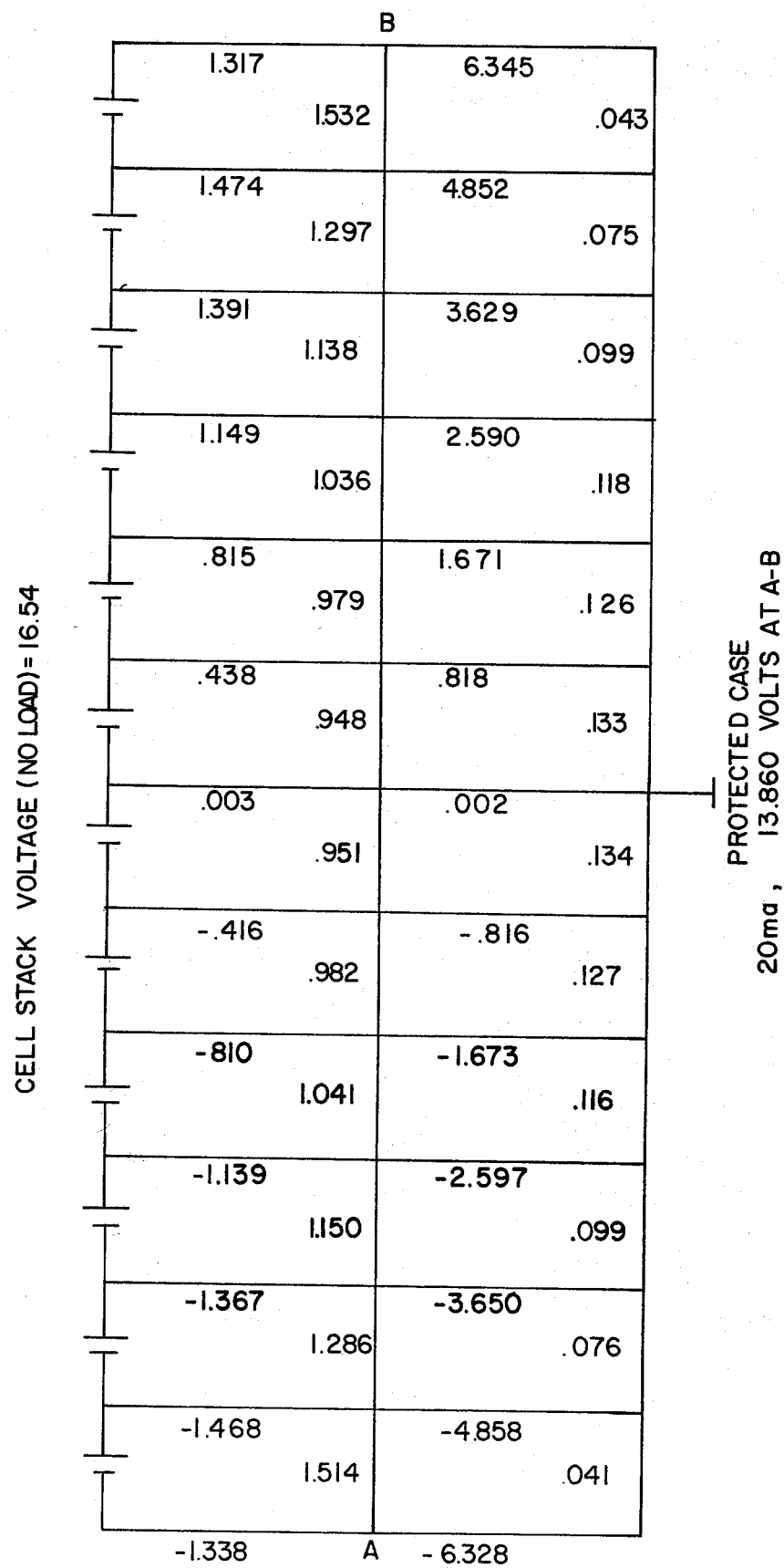
Figure 9:
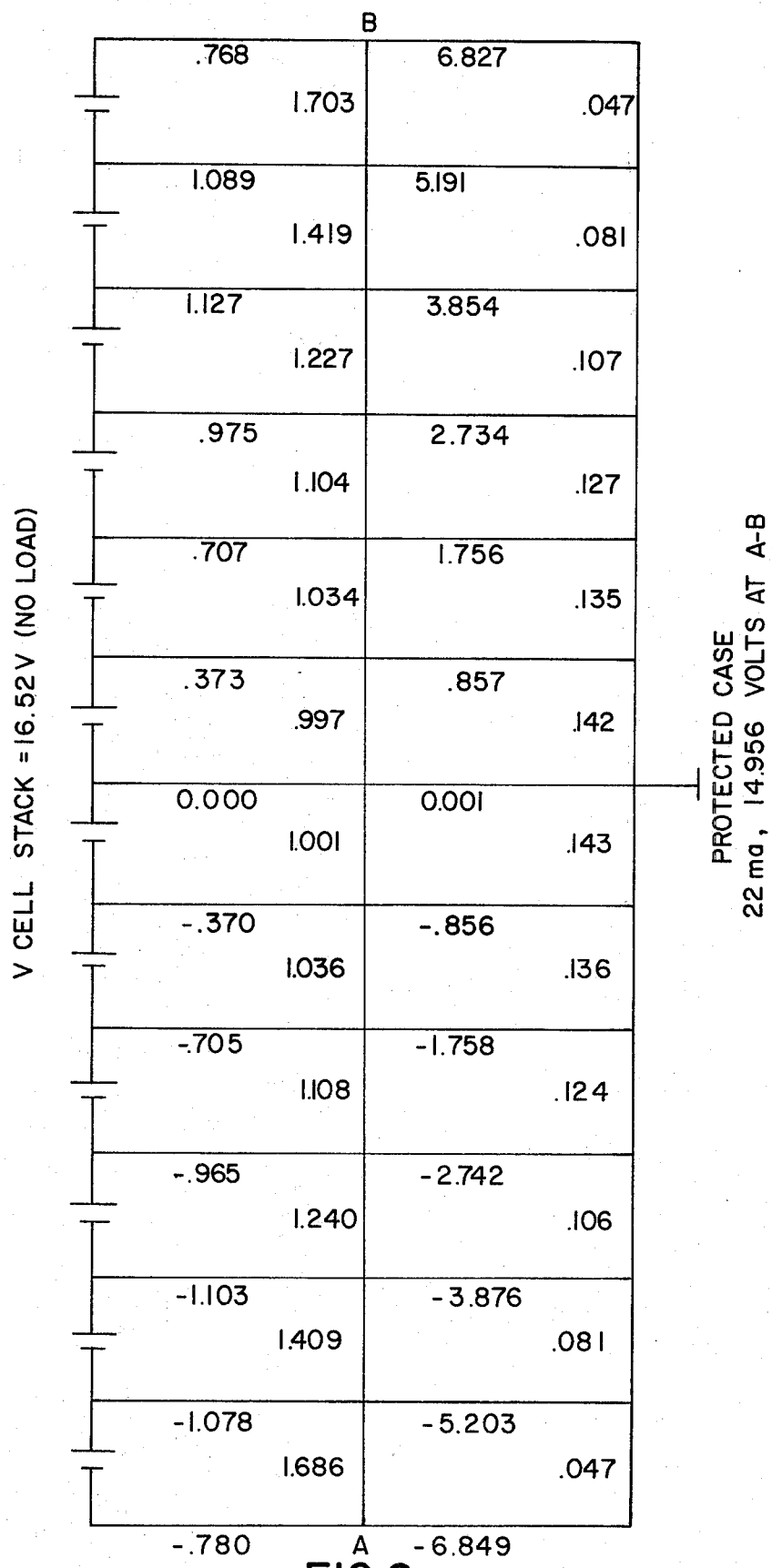
Figure 10:
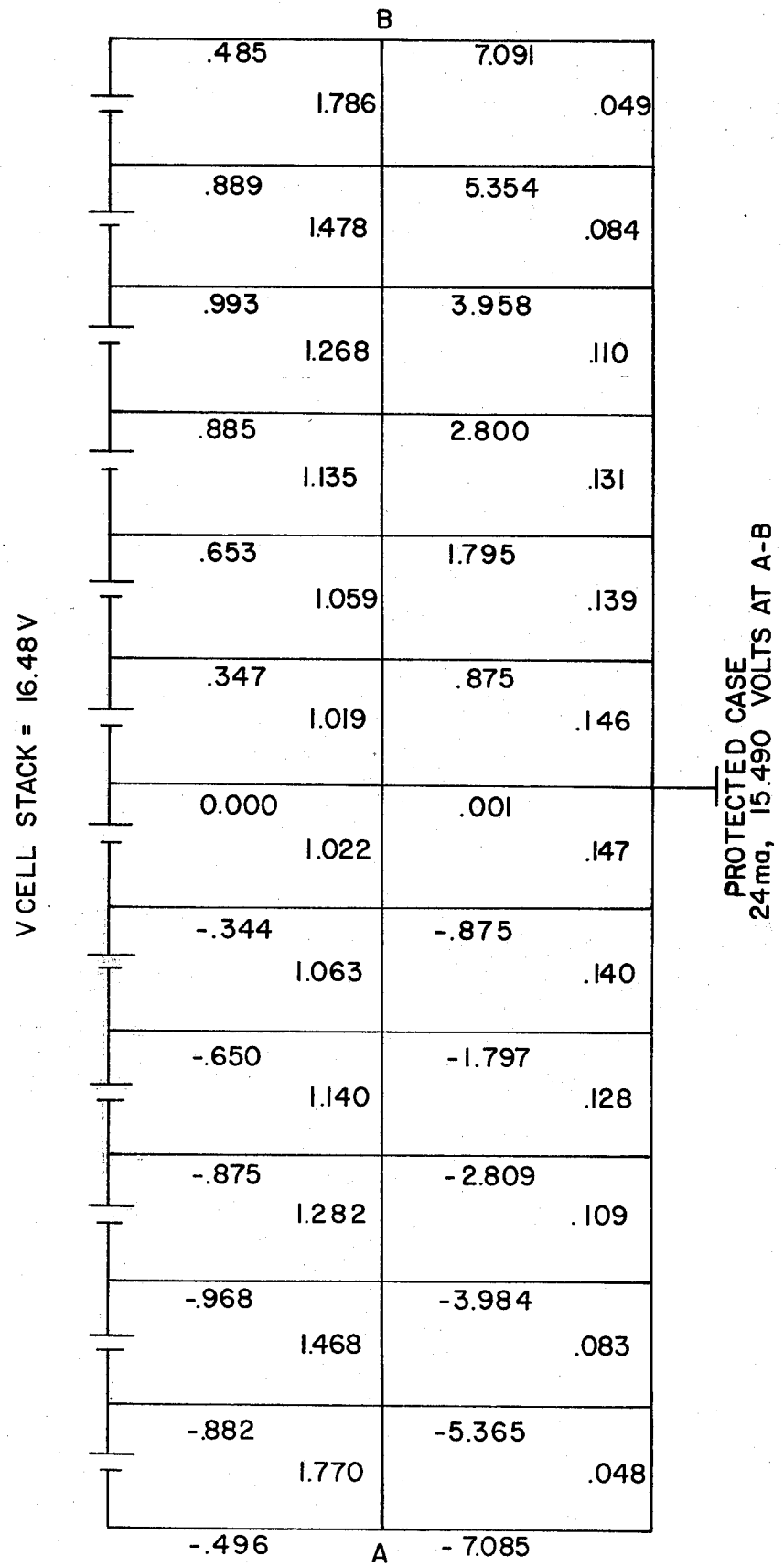

A protective current is employed in accordance with the present invention in conjunction with a stack of series connected zinc-bromine monopolar cells. As shown in FIG. 4, battery devices having a series connected stack of eight monopolar cells is illustrated generally as 80. Monopolar cell 82 is representative of the cells and contains anode 84 and cathode 86. Anolyte flows into cell 82 at compartment 88 via channel 90 and catholyte flows into cell 82 at compartment 92 via channel 94. Compartment 88 and compartment 92 are divided by ionically permeable membrane separator 96. Cell 88 is connected in series to the next adjacent cell 98 via connection 100. End cells 82 and 102 contain terminals 104 and 106, respectively. The anolyte flowing into compartment 88 via channel 90 does so via shared electrolyte manifold 108, which feeds anolyte to all of the cells. The anolyte exits compartment 88 via channel 110, and through shared electrolyte manifold 112, through which all anolyte exits. The catholyte flowing into compartment 92 via channel 94 does so via shared electrolyte manifold 114, which feeds catholyte to all of the cells. The catholyte exits compartment 92 via channel 116, and through shared electrolyte manifold 118, through which all catholyte exits.

The sets of channels represented by 90, 94, 110 and 116 for manifolds 108, 114, 112 and 118, respectively, each have a set of connecting tunnels. Thus, the sets of tunnels 70, 72, 74 and 76 connect the individual channels from manifolds 108, 114, 112 and 118, respectively, as shown.

Means for providing protective currents to this device 80 are located on each of the far ends of the four sets of tunnels within the shared electrolyte. Anolyte tunnel sets 70 and 74 have protective current negative electrodes 120 and 122, respectively, and protective current positive electrodes 124 and 126, respectively. Catholyte tunnel sets 72 and 76 have protective current negative electrodes 128 and 130, respectively, and positive electrodes 132 and 134, respectively. By way of example, a protective current is applied between negative electrode 120 and positive electrode 124 to effect the protective current through the shared electrolyte across tunnel set 70, thereby nulling or minimizing shunt currents passing through the conductive bypass path, i.e. passing from the channels connected with manifold 108 and otherwise passing therethrough. Similarly, protective currents are applied across tunnel sets 72, 74 and 76 through the shared electrolyte.

Both the anolyte and the catholyte are circulated through their respective manifolds, channels, tunnels and compartments during operation of the device and are recirculated from reservoirs (not shown). As illustrated, the monopolar cells in device 80 are connected electrically in series and hydraulically in parallel. Without application of the protective currents of the present invention, significant shunt currents arise in the channels and manifolds. In this zinc-bromine device, the shunting not only results in loss of capacity and consumption of components, but also causes the growth of zinc at various points where the anolyte leaves and enters zinc electrode compartments. The distribution of deposited zinc on charge is not uniform throughout the battery and, correspondingly, the use of zinc on discharge is not uniform.

Device 80 is operated without protective current and with protective current in accordance with the present invention for a discharge cycle, a charge cycle and an open circuit cycle. The protective currents are applied across the tunnels with a total voltage drop approximately equal to the terminal battery voltage. The protective current entering the tunnel divides at each junction of a tunnel and channel. A portion passes into the next tunnel and a portion passes into the channel. Those currents which pass into the manifold at the high voltage end of the battery return back from the manifold into the channels and thus into the tunnels at the low voltage end of the battery. The protective current leaves at the tunnel exit. The voltage at each tunnel channel node, when the appropriate current is applied to the tunnels, approximates that of the series connected cell at that channel. Thus, the voltage difference between the cell and the tunnel through the channel is small to zero and the shunt current is correspondingly small to zero. Thus, the protective currents minimize shunt currents throughout the device, during discharge, charge and open circuit, when applied through the shared electrolyte of the tunnels.

EXAMPLES 3–15

Twelve Ni-Cd batteries are connected in series and a network of resistors, representing legs and channels, are placed between and out from the cell connections. These resistors are connected by other resistors which represent the tunnels and manifold segments. One set of conditions and battery voltages and resistor values is shown in FIG. 5.

When voltage and current are supplied to the points A and B of FIG. 5, the voltage and current will divide depending on the voltage of the series of cells and the resistance values of the manifold segments $R_m$, the channels above the tunnels $R_c$, the tunnels $R_T$, and the legs between the cells and the tunnel junction $R_L$ (using the same symbols as employed in the discussion of FIGS. 1 and 2, supra).

If this system were protected by a manifold current (and the tunnels were not present), the current necessary to null the voltage difference across the channels would be determined by the resistance of the manifold segments. In this case, the voltage of the cells is approximately 16.8 volts and the manifold resistance is 122 ohms (12×10.2). The current then is about 137 ma.

The unprotected case is shown in FIG. 6. The voltage drop across each resistor is as shown. (The currents in each resistor can be computed by Ohms law from the values of the resistors given in FIG. 5.)

Figure 15:
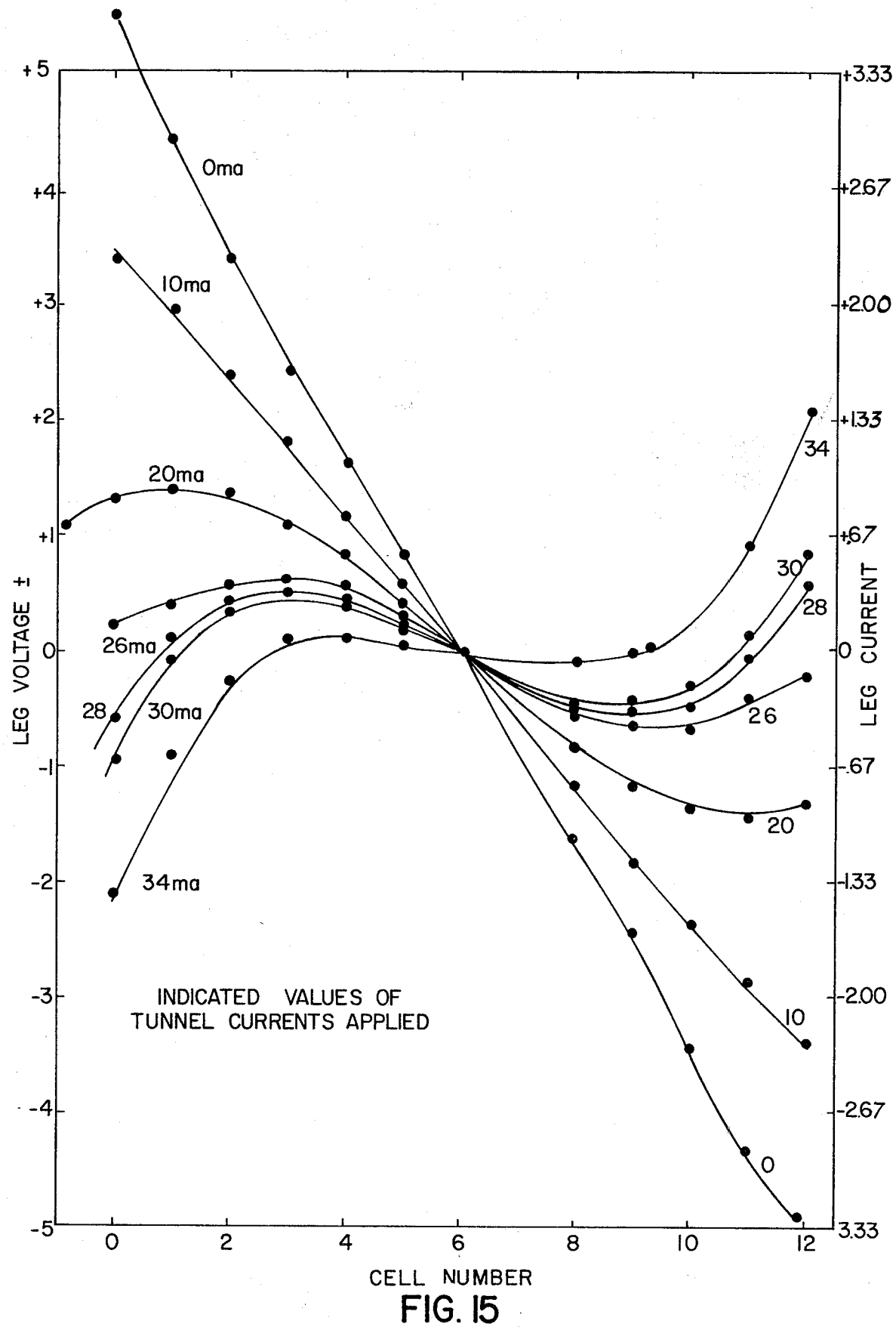
FIG. 15 illustrates a plot of voltage drop and current for the legs of each cell vs. cell number for the same system; and, FIG. 16 illustrates voltages during charging of the same system.

In FIGS. 7 through 14, various currents are applied across A-B of FIG. 5 and the voltage across each resistor is measured. The voltage drop and currents for the legs for each cell are ploted vs. cell number in FIG. 15.

As the current applied at the tunnel nodes (A-B) is increased, the leg voltages and currents decrease. At currents in the region of 26 to 28 ma, the leg currents and thus the shunt currents from the cell stack are reduced to a small fraction of unprotected values.

The shunt currents are reduced to near zero values in this case for about 1/5 of the current needed for the manifold protected case. The power for protection is correspondingly lower.

Figure 12:
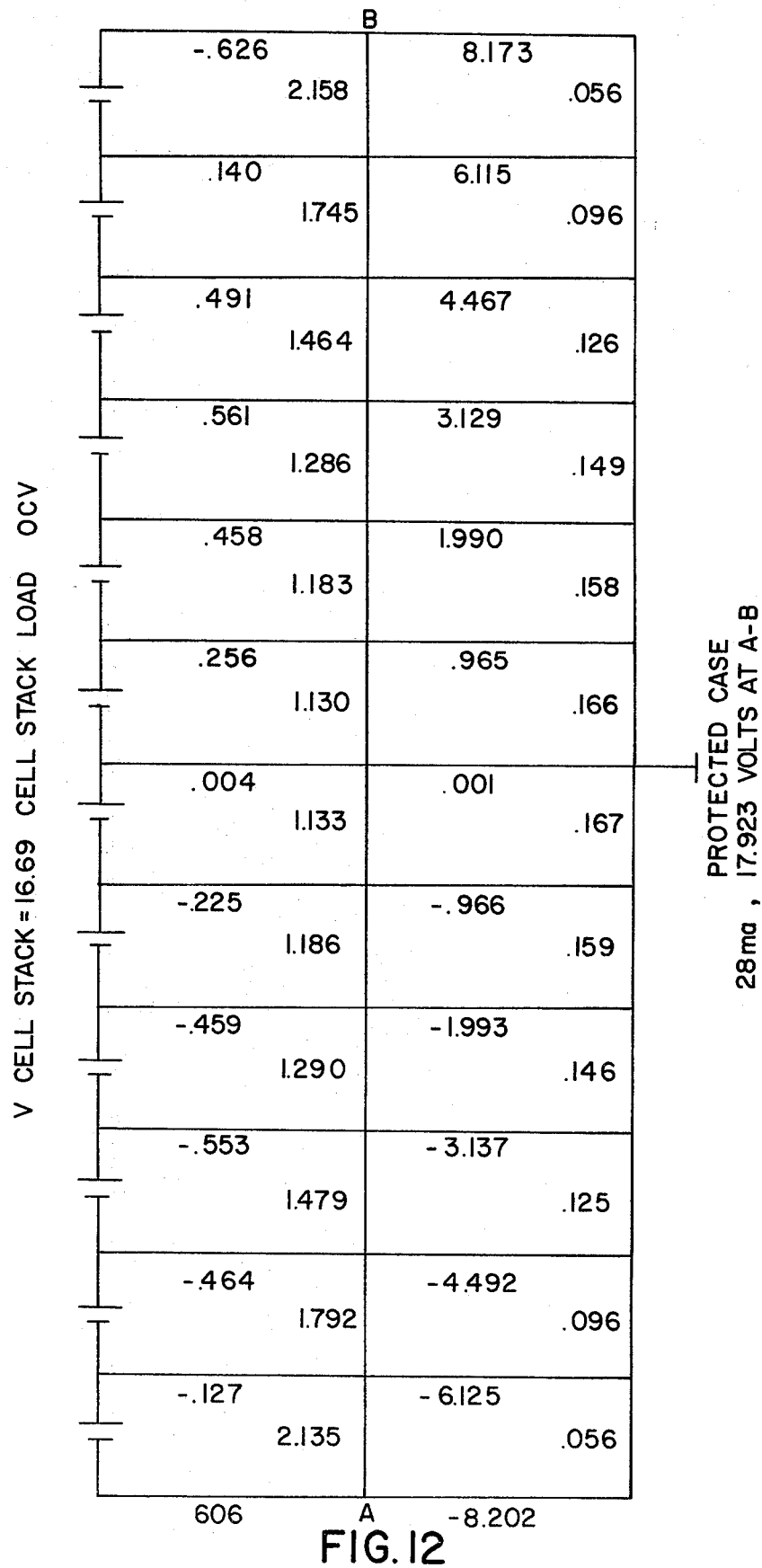
Figure 14:
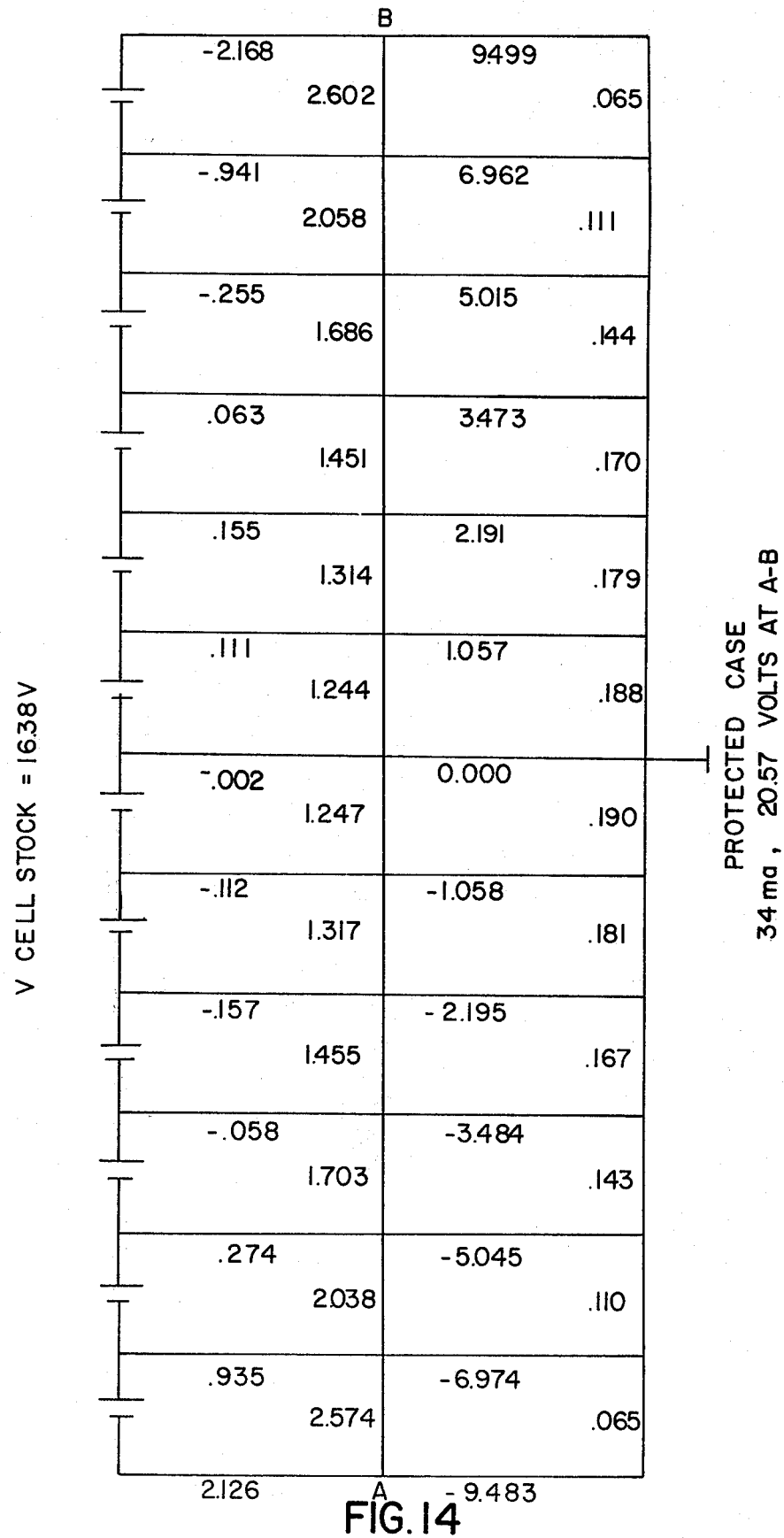

Computation of the wattage for the unprotected case FIG. 6 and the wattages for protected cases FIGS. 11 and 12, for example, shows that the power used in the protected cases of near zero shuntage current is very close to the power that would have been lost in the unprotected case.

Figure 16:
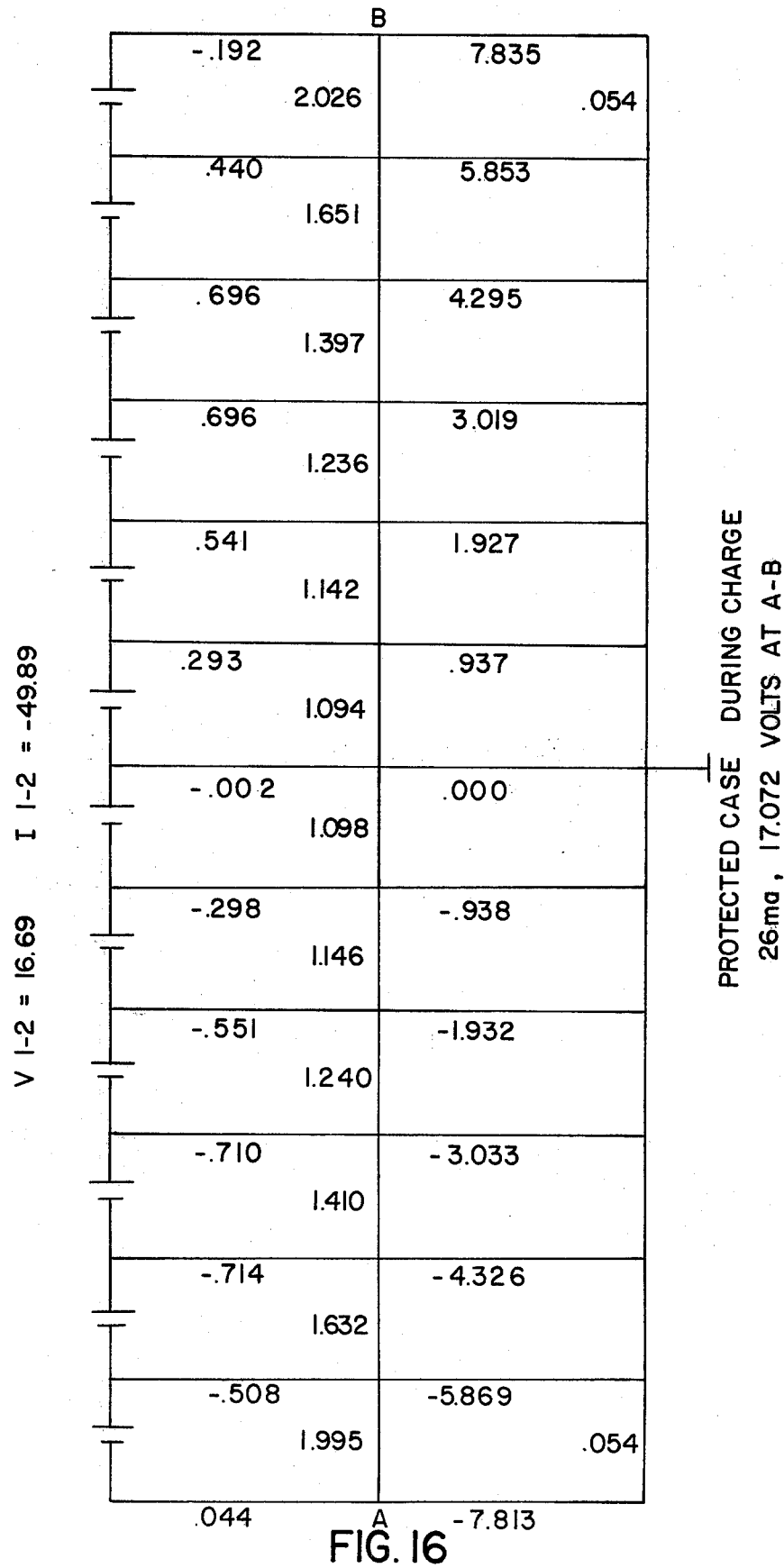

The system under charge condition is shown in FIG. 16. A current of 49.8 ma charges the cell string and 26 ma is applied to the tunnel nodes.

The amount of power needed for the shunt current reduction in the tunnel case is controlled by the number of cells in the stack, the magnitude of the channel and tunnel resistances, and, to a lesser extent, the manifold segment resistance. Consistent with other system design constraints, the values of these parameters are adjusted to minimize power inputs.

What is claimed is:

1. A method of minimizing shunt currents in an electrochemical device having a plurality of cells, said cells being connected, at least in part, in series, said device having an electrolyte which is fed to at least two of said cells as a shared electrolyte from a common manifold via individual inlet channels, whereby an electrical electrolytic conductive bypass path is created around these cells and through said shared electrolyte, which otherwise results in undesirable shunt currents, said method comprising providing electrolyte tunnels which connect the individual inlet channels and applying a protective current through said electrolyte tunnels and thus through said shared electrolyte, the protective current being of a magnitude which effectively at least reduces said shunt currents.

2. The method of claim 1 wherein said electrochemical device has a plurality of cells all of which are connected in series.

3. The method of claim 1 wherein said electrochemical device is a battery.

4. The method of claim 1 wherein said electrochemical device is a fuel cell device.

5. The method of claim 1 wherein said electrochemical device is a chlor-alkali cell device.

6. The method of claim 1 wherein said electrochemical device is an electrowinning device.

7. The method of claim 1 wherein said electrochemical device is an electrolyzer.

8. The method of claim 1 wherein said electrochemical device is an electrochemical device having a plurality of electrolytes.

9. The method of claim 1 wherein said electrochemical device is an electrochemical device having bipolar cells.

10. The method of claim 1 wherein said electrochemical device is an electrochemical device having monopolar cells.

11. The method of claim 1, 2, 3, 4, 5, 6, 7, 8 9 or 10 wherein said device further includes individual outlet channels and common manifold through which said electrolyte is removed from the cells of said device and wherein said method further comprises providing electrolyte tunnels which connect the individual outlet channels and applying a protective current through said electrolyte tunnels.

12. A method of minimizing shunt currents in an electrochemical device having a plurality of cells, said cells being connected, at least in part, in series, said device having an electrolyte which is removed from at least two of said cells as a shared electrolyte from a common manifold via individual outlet channels, whereby an electrical electrolytic conductive bypass path is created around these cells and through said shared electrolyte, which otherwise results in undesirable shunt currents, said method comprising providing electrolyte tunnels which connect the individual outlet channels and applying a protective current through said electrolyte tunnels and thus through said shared electrolyte, the protective current being of a magnitude which effectively at least reduces said shunt currents.

13. The method of claim 12 wherein said electrochemical device has a plurality of cells all of which are connected in series.

14. The method of claim 12 wherein said electrochemical device is a battery.

15. The method of claim 12 wherein said electrochemical device is a fuel cell device.

16. The method of claim 12 wherein said electrochemical device is a chlor-alkali cell device.

17. The method of claim 12 wherein said electrochemical device is an electrowinning device.

18. The method of claim 12 wherein said electrochemical device is an electrolyzer.

19. The method of claim 12 wherein said electrochemical device is an electrochemical device having a plurality of electrolytes.

20. The method of claim 12 wherein said electrochemical device is an electrochemical device having bipolar cells.

21. The method of claim 12 wherein said electrochemical device is an electrochemical device having monopolar cells.

22. An electrochemical device comprising:

(a) a plurality of cells, said cells being connected, at least in part, in series;

(b) individual inlet channels connected to at least two of said cells connected in series;

(c) a common manifold connected to said individual inlet channels;

(d) electrolyte tunnels connecting said individual inlet channels to one another;

(e) means for supplying an electrolyte to at least two of said cells as a shared electrolyte from said common manifold via said individual inlet channels, whereby an electrical electrolytic conductive bypass path is created around these cells and through said shared electrolyte and is capable of resulting in undesirable shunt currents; and, (f) means for applying a protective current through at least a part of said electrolyte tunnels and thus through said shared electrolyte, the protective current being of a magnitude which effectively at least reduces said shunt currents.

23. The device of claim 22 wherein said plurality of cells are all connected in series.

24. The device of claim 22 wherein said electrochemical device is a battery.

25. The device of claim 22 wherein said electrochemical device is a fuel cell device.

26. The device of claim 22 wherein said electrochemical device is a chlor-alkali cell device.

27. The device of claim 22 wherein said electrochemical device is an electrowinning device.

28. The device of claim 22 wherein said electrochemical device is an electrochemical device having a plurality of electrolytes.

29. The device of claim 22 wherein said electrochemical device is an electrolyzer.

30. The device of claim 22 wherein said electrochemical device is an electrochemical device having bipolar cells.

31. The device of claim 22 wherein said electrochemical device is an electrochemical device having monopolar cells.

32. The device of claim 22, 23, 24, 25, 26, 27, 28, 29, 30 or 31 which further comprises:

(g) individual outlet channels connected to at least two of said cells connected in series;

(h) a common manifold connected to said individual outlet channels;

(i) electrolyte tunnel connecting said individual outlet channels to one another; and, (j) means for applying a protective current through at least a part of said electrolyte tunnels connecting said individual outlet channels to one another, the protective current being of a magnitude which effectively at least reduces said shunt currents.

33. An electrochemical device comprising:

(a) a plurality of cells, said cells being connected, at least in part, in series;

(b) individual outlet channels connected to at least two of said cells connected in series;

(c) a common manifold connected to said individual outlet channels;

(d) electrolyte tunnels connecting said individual outlet channels to one another;

(e) means for supplying an electrolyte which is removed from at least two of said cells as a shared electrolyte from said common manifold via said individual outlet channels, whereby an electrical electrolytic conductive bypass path is created around these cells and through said shared electrolyte and is capable of resulting in undesirable shunt currents; and, (f) means for applying a protective current through at least a part of said electrolyte tunnels and thus through said shared electrolyte, the protective current being of a magnitude which effectively at least reduces said shunt currents.

34. The device of claim 33 wherein said plurality of cells are all connected in series.

35. The device of claim 33 wherein said electrochemical device is a battery.

36. The device of claim 33 wherein said electrochemical device is a fuel cell device.

37. The device of claim 33 wherein said electrochemical device is a chlor-alkali cell device.

38. The device of claim 33 wherein said electrochemical device is an electrowinning device.

39. The device of claim 33 wherein said electrochemical device is an electrochemical device having a plurality of electrolytes.

40. The device of claim 33 wherein said electrochemical device is an electrolyzer.

41. The device of claim 33 wherein said electrochemical device is an electrochemical device having bipolar cells.

42. The device of claim 33 wherein said electrochemical device is an electrochemical device having monopolar cells.

* * * * *